Figure 1:
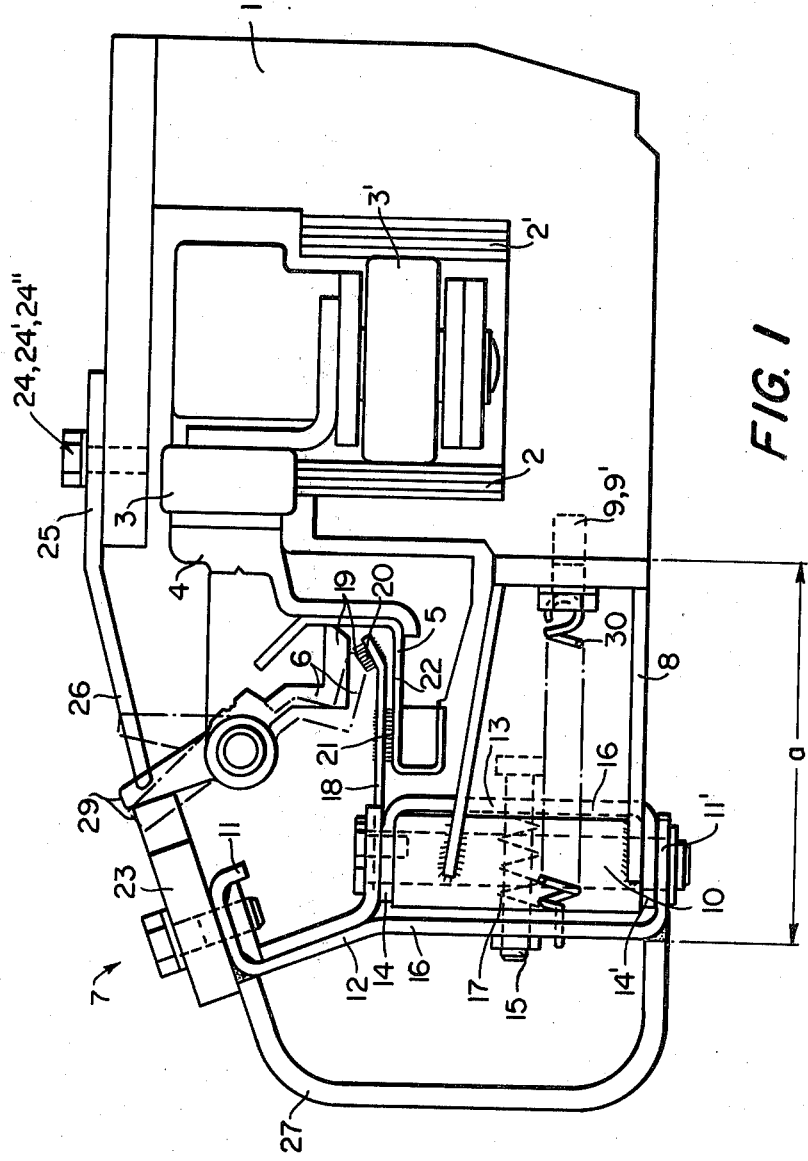

United States Patent [19]

Rottensteiner

[11] 4,176,429
[45] Dec. 4, 1979

[54] APPARATUS FOR CLEANING CLAMPING SURFACES

[75] Inventor: Hans Rottensteiner, Schwarzach, Austria

[73] Assignee: Lindauer Dornier Gesellschaft mbH, Fed. Rep. of Germany

[21] Appl. No.: 874,698

[22] Filed: Feb. 2, 1978

[30] Foreign Application Priority Data

Mar. 22, 1977 [DE] Fed. Rep. of Germany ....... 2712477

[51] Int. Cl.² .............................................. D06C 3/02
[52] U.S. Cl. ......................................... 26/93; 26/94; 26/96; 198/496
[58] Field of Search ...................... 198/496; 26/52, 89, 26/93, 94, 95, 96; 34/158

[56] References Cited

U.S. PATENT DOCUMENTS

| 3,284,828 | 11/1966 | Jennings et al. | 198/496 |
| 3,858,715 | 1/1975 | Brock et al. | 198/496 |

FOREIGN PATENT DOCUMENTS 47-20269 9/1972 Japan .......................................... 26/93

Primary Examiner—Jeffrey V. Nase
Attorney, Agent, or Firm—James E. Bryan

[57] ABSTRACT

This invention relates to an apparatus for cleaning the clamping surfaces of tenter hook or clip tables and small flaps of tenter hooks or clips during the operation of a tenter hook or clip chain, which comprises a carrier member secured to a tenter hook or clip chain/guide path, an axle vertically positioned with respect to said path, a brush mounting unit supported by said axle and having upwardly and downwardly directed rows of brushes, said brush mounting unit being pivotal on said axle and flexibly connected with the carrier member by a resilient member and, in a position of rest thereof, being positioned so as to be pivoted away from the tenter hook or clip, said brush mounting unit, in the operating position thereof, being pivoted against the tenter hooks or clips in the open position thereof, and whereby the upper row of brushes scrapes and brushes clamping surfaces of the small flaps, and the lower row of brushes scrapes and brushes clamping surfaces of the tenter hook or clip tables.

6 Claims, 2 Drawing Figures

APPARATUS FOR CLEANING CLAMPING SURFACES

The present invention relates to an apparatus for cleaning the clamping surfaces on tenter hook or clip tables and the small flaps of tenter hooks or clips during the run of a tenter or clip chain.

During the running-in of a sheet of material into the holding plane and/or the holding or supporting zone of the tenter hook or clip chain, and during the seizing of the edges of the sheet of material by the tenter hooks or clips, abrasion is produced. This abrasion is composed primarily of the material of the sheet of material and becomes mixed with the dirt and oil particles in the air surrounding the same, the particles being whirled about by the relatively rapidly revolving tenter hook or clip path, to form a dirty or oily, smudgy mass. This mass is deposited within a short period of time on the tenter hooks or clips and forms deposits and incrustations preferentially on the clamping surfaces formed by the tenter hook or clip tables and the small flaps. As a result thereof, a secure or safe closing of the tenter hooks or clips and a clamping and holding of the material sheet edges by the clamping surfaces is no longer guaranteed; the edges of the sheet of material will slip out of the tenter hooks or clips.

In actual practice, the tenter hooks or clips and their clamping surfaces are cleaned manually to remove the oily deposit and/or the incrustations adhering thereto. For this purpose it is necessary to stop the tenter hook or clip chain, and to subject the tenter hooks or clips and the clamping surfaces thereof individually to a cleaning operation, for example by brushing them off or by rubbing them off. In particular and difficult cases, for example in the case of a very tightly adhering incrustation, the tenter hooks or clips must be individually detached from the chain in order that an optimal cleaning can be achieved. Such procedures, however, involve great expenditures with respect to time and personnel.

It is therefore the object of the present invention to provide an apparatus with the aid of which the tenter hooks or clips, and preferably their clamping surfaces formed by the tenter hook or clip tables and the small flaps, can be cleaned of deposits and incrustations. In this connection it is desirable that the apparatus be positioned in a stationary manner on the tenter hook or clip chain/guide path, and be selectively in either continuous or temporary engagement with the opened tenter hooks or clips and the clamping surfaces thereof.

The advantage of the present invention resides particularly in that, already during the run of the tenter hook or clip chain, any soiling, deposit, or incrustation on the clamping surfaces due to abrasion is effectively prevented by virtue of the brushes which scrape or graze either continuously or at intervals on and along the clamping surfaces. The shut-down of the running tenter hook or clip chain for the purpose of cleaning the clamping surfaces in the individual tenter hooks or clips is therefore no longer required.

Figure 2:
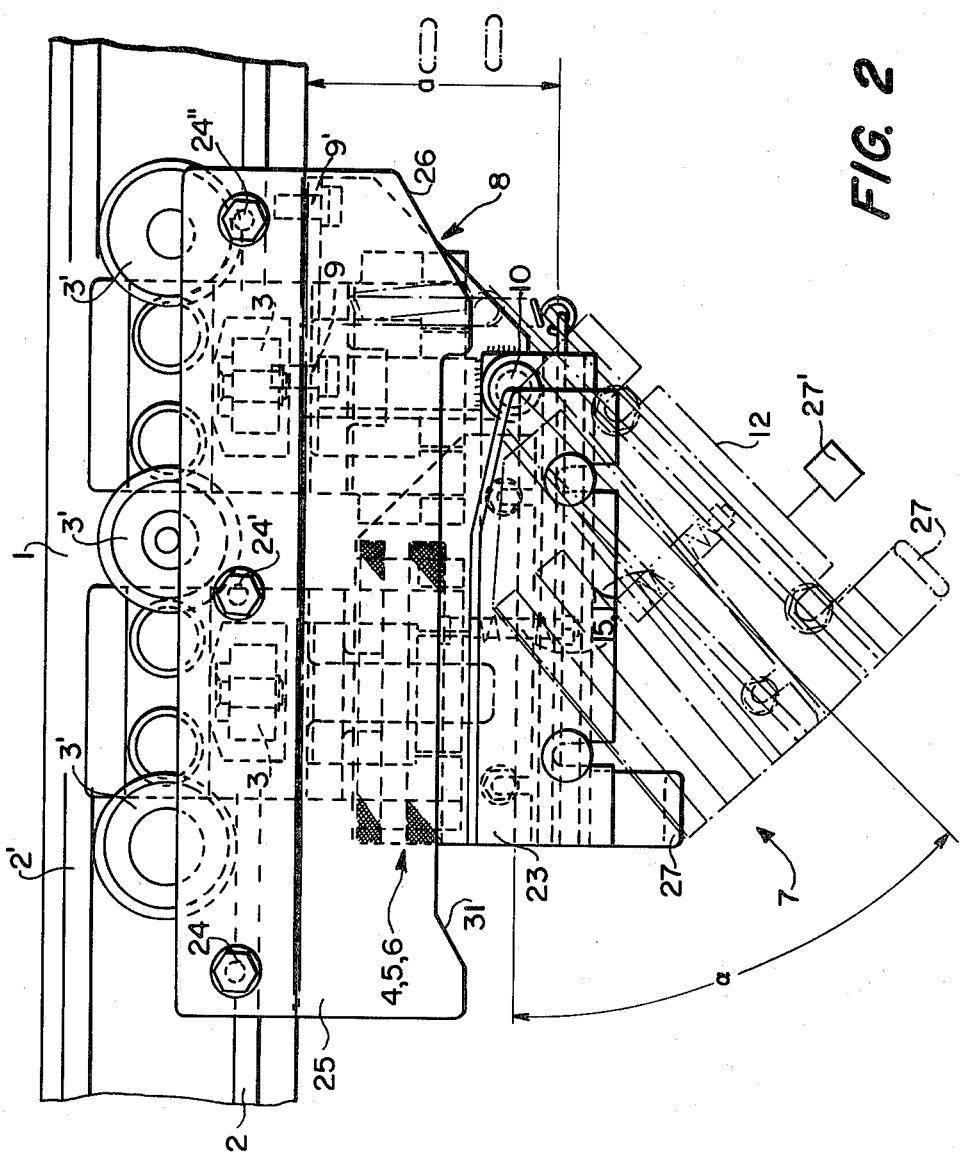

Further advantages and features of the present invention will become apparent from the following description of the figures in the accompanying drawing, wherein FIG. 1 is a cross-sectional view through a tenter hook or clip chain/guide path with a laterally-disposed brush mounting, and FIG. 2 is a top plan view of the apparatus shown in FIG. 1.

As is evident from FIGS. 1 and 2, a brush mounting 7 together with a carrier or bearer member 8 is laterally mounted at or secured - by means of fastening screws 9, 9' (see also FIG. 2) - to a tenter hook or clip chain/guide path 1 composed of carrying and guide bars or rails 2, 2', carrying and guide rollers 3, 3', and a tenter hook or clip 4 with a tenter hook or clip table 5 and small flaps 6. A vertically-positioned axle 10 is disposed in the carrier or bearer member 8 at a distance a opposite the fastening screws 9, 9', and about the axle the brush mounting 7 is pivotally positioned through an angle α (FIG. 2).

The brush mounting assembly or unit 7 is composed of an outer U-shaped and upwardly angularly bent portion 12 pointing with its legs 11, 11' toward the tenter hook or clip chain/guide path 1, and of an inner, equally U-shaped portion 13 whose legs or leg portions 14, 14' point toward the portion 12 (FIG. 1). Both of these parts or portions 12 and 13 are flexibly connected by a screw bolt 15 and a spring 17 mounted thereon and supported against the walls 16, 16' which are parallel to each other, and are pivotal as one unit about the axle 10 (FIG. 1). Positioned on the upper U-shaped leg portion 14 of the inner part or portion 13 is a removable plate 18 whose forward end facing the tenter hook or clip 4 is upwardly angularly bent toward the clamping surface 19 of the small flap 6. Mounted at this angularly bent end and on the upper side thereof is a row of brushes 20 directed toward the clamping surface 19. Arranged on the underside of the straight part of the plate 18 is another row of brushes 21 directed toward the clamping surface 22 of the tenter hook or clip table 5 (FIG. 1). The leg portion 11 of the outer U-shaped and upwardly angularly bent part or portion 12, which leg portion belongs to the wall 16, is provided with a removable control bar or rail 23 (FIGS. 1 and 2) which is beveled on the side thereof positioned over the axle 10. Positioned above the small flap 6 is an opening ledge 25 (FIGS. 1 and 2) being angularly bent with respect to the former, i.e., the small flap and secured above the carrying roller 3 to the tenter hook or clip/guide path or course 1 by means of the screws 24, 24', and 24". Thereby the angularly bent partial portion of the opener ledge 25 which is provided on the feed side with a beveled run-in or feed surface 26 is positioned in the plane of the control rail or bar 23 (FIG. 1) the latter being positioned on the leg portion 11 of the outer part or portion 12.

When it is intended that the brush mounting 7 and the brushes 20 and 21 disposed thereon be put in operation and act upon the clamping surfaces 19 and 22, the brush mounting 7 is pivoted about the axle 10 and through the angle α against the tenter hook or clip 4 (FIG. 2). This pivoting action may be effected either manually by operating the handle 27 (FIGS. 1 and 2), which is positioned at the outer portion 12, or by mechanical means 27'. The tenter hooks or clips 4 are normally open during the return travel of the chain. In order to open any tenter hooks or clips 4 which may not have opened, for example due to soiling, the beveled feed or run-in surface 26 presses against the shut/open lever 29. As a result, the clamping surfaces 19 and 22 of the tenter hook or clip table 5 and small flaps 6 are exposed and, during the pivoting-in of the brush mounting 7, the brushes 20 and 21 will be pressed thereagainst (FIG. 1). In this connection it is advantageous that, by means of the screw bolt 15 and the spring 17 resting thereon, and the thus obtained elastic connection of the inner portion 13 with respect to the outer portion 12, the brush mounting 7 is brought into the operating and brushing position thereof, (see the position of the small flab 6 in FIGS. 1 and 2 on the outer righthand side shown in dash-dotted lines) before the control bar or rail 23 acuates the shut/open lever 29 and thereby presses the clamping surface 19 against the brush 20. Simultaneously therewith the contact pressure of the brushes 21 against the clamping surface 22 of the tenter hook or clip table 5 is increased.

Once the clamping surfaces 19 and 22 have been cleaned, the brush mounting 7 is again pivoted out with the aid of a return spring 30 which is positioned at the part or portion 8 and the wall 16.

For reopening the small flap 6 out of the brushing position, an oblique surface 31 (FIG. 2) is positioned at the discharge of the opener ledge 25, and by means thereof the shut/open lever 29 is brought into the open position.

The cleaning of all clamping surfaces of the tenter hooks or clips combined to form a tenter hook or clip chain is possible during the operation thereof and within a very short period of time. For this purpose a complete stoppage of the clip chain is no longer necessary. A reduced operating speed is sufficient therefor.

It will be obvious to those skilled in the art that many modifications may be made within the scope of the present invention without departing from the spirit thereof, and the invention includes all such modifications.

What is claimed is:

1. An apparatus for cleaning the clamping surfaces of tenter hook or clip tables and small flaps of tenter hooks or clips during the operation of a tenter hook or clip chain, which comprises a carrier member secured to a tenter hook or clip chain/guide path,
   an axle vertically positioned with respect to said path,
   a brush mounting unit supported by said axle and having upwardly and downwardly directed rows of brushes,
   said brush mounting unit being pivotal on said axle and flexibly connected with the carrier member by resilient means and, in a position of rest thereof, being positioned so as to be pivoted away from the tenter hook or clip,
   said brush mounting unit, in the operating position thereof, being pivoted against the tenter hooks or clips in the open position thereof,
   and whereby the upper row of brushes scrapes and brushes clamping surfaces of the small flaps, and the lower row of brushes scrapes and brushes clamping surfaces of the tenter hook or clip tables.

2. An apparatus according to claim 1 in which the brush mounting is composed of an outer and of an inner portion being pivotal independently of each other about the axle, whereby the inner portion is flexibly supported against the outer portion.

3. An apparatus according to claim 2 in which the brushes are positioned on a plate which is removable from the inner portion.

4. An apparatus according to claim 3 including, above the brushes and the plate, a unilaterally obliquely cut control bar in rigid connection with the outer portion.

5. An apparatus according to claim 1 including means whereby the brush mounting unit is pivotal alternately either manually or mechanically.

6. An apparatus according to claim 1 including an opener ledge on the tenter hook or clip chain/guide path and over the small flap, said ledge being angularly bent with respect to a shut/open lever.

* * * * *